United States Patent Office.

JOHN ROBINSON KELSEY, OF BETHNAL GREEN, COUNTY OF MIDDLESEX, ASSIGNOR TO WILLIAM HENRY GREENWOOD, OF LONDON, ENGLAND.

MANUFACTURE OF SOFT HATS.

SPECIFICATION forming part of Letters Patent No. 398,734, dated February 26, 1889.

Application filed December 19, 1888. Serial No. 294,104. (No specimens.) Patented in England September 17, 1888, No. 13,429.

*To all whom it may concern:*

Be it known that I, JOHN ROBINSON KELSEY, a subject of the Queen of Great Britain, residing at 209 Wilmot Street, Bethnal Green, in the county of Middlesex, England, have invented new and useful Improvements in the Manufacture of Soft-Fitting Hats and in the Preparation and Employment of Ingredients for the Purpose of such Manufacture, (patented in Great Britain, No. 13,429, bearing date September 17, 1888,) of which the following is a specification.

This invention relates to a novel method of manufacturing soft-fitting hats, the body being made of felt, of fur, of wool, or the like, or a combination of any of such materials, the object being to preserve flexibility and porosity, so that the hat may adapt itself to suit the shape of head without undue pressure. The covering of the hat may be of silk, plush, merino, tweed, or any other desired material—say Italian cloth or the like.

In order to prepare the body according to my invention, I use certain ingredients prepared in a special manner. I first make a combination of, say, six pounds of shellac and two pounds of gum-mastic dissolved in methylated spirits, to which I add two ounces collodion. I take two ounces virgin rubber and dissolve it in a suitable quantity of bisulphide of carbon, to which I add three ounces boiled linseed-oil and thoroughly mix the same. I dissolve one pound of thus by heat and then add sufficient turpentine to hold it in solution. These three mixtures are then compounded and reduced to any desired strength with methylated spirits. This mixture I call "No. 1." The hat-bodies are then proofed with it in the ordinary way. The body is then blocked, and the tip and brim strengthened by the same composition, but of greater density; or a robin cut on the bias may be put round the square, and a cover of calico may be put over the tip, if preferred; but no calico or cover of any kind must be put upon the side crown. In order to support the curl and shape of the brim, a strip of calico cut on the bias may be pulled round the edge to about half the width of the brim. The body is then finished with hot iron and water as when finishing a felt hat.

I next prepare four mixtures—say A, B, C, and D. A is composed of six pounds orange shellac dissolved in liquid ammonia and six quarts of water. B is composed of two pounds mastic and half-pound gum-elimi, and I dissolve these in methylated spirit. C is composed of one pound of thus, reduced by heat, and then add sufficient turpentine to hold it in solution. D is composed of two ounces virgin rubber dissolved in bisulphide of carbon, to which I add two ounces collodion. I then compound these four mixtures A, B, C, and D. The compounded mixture in "lather" form is now brushed onto the body in lieu of the ordinary spirit varnish, and the plush or other fabric applied as a covering, which is then finished in the ordinary way.

The proportions of the several ingredients given may be slightly varied.

By this invention I dispense with the use of calico for coverings. I also dispense with the usual process of ironing-up hat-bodies with paste or other preparation. I thus obtain softness and pliability, so that the hat will adapt itself to different shapes of heads. At the same time I preserve the flexibility and the porosity of the body, which allows the heat to escape.

What I claim, and desire to secure by Letters Patent, is—

1. In the manufacture of soft felt or similar hats, the process herein described of proofing the hat-body, which consists in applying thereto a compound or mixture composed of a solution of shellac, gum-mastic, collodion, rubber, bisulphide of carbon, oil, and turpentine, and subsequently blocking and applying plush or similar fabric to the proofed body, substantially as set forth.

2. The process herein described of manufacturing soft felt or similar hats, which consists in preparing and proofing the hat-body, then blocking the same, then applying thereto a lather mixture composed of a solution of shellac, ammonia, mastic, thus, turpentine, rubber, bisulphide of carbon, and collodion, and finally applying a covering of plush or other fabric, substantially as set forth.

3. The process herein described of manufacturing soft felt or similar hats, which consists in preparing the hat-body and proofing it by applying thereto a compound or mixture composed of a solution of shellac, gum-mastic, collodion, rubber, bisulphide of carbon, oil, and turpentine, then blocking the body and applying thereto another mixture composed of a lather solution of shellac, ammonia, mastic, thus, turpentine, rubber, bisulphide of carbon, and collodion, and finally covering the same with plush or other fabric, substantially as set forth.

In witness whereof I have hereto signed my name, in the presence of two subscribing witnesses, this 24th day of October, 1888.

JOHN ROBINSON KELSEY.

Witnesses:
   W. H. GREENWOOD,
     110 *Fenchurch Street, London.*
   R. CORE GARDNER,
     166 *Fleet Street, London, England.*